UNITED STATES PATENT OFFICE.

GEORGE HENRY RICHARDS, OF LONDON, ENGLAND.

NICOTIN INSECTICIDE.

SPECIFICATION forming part of Letters Patent No. 685,060, dated October 22, 1901.

Application filed April 8, 1901. Serial No. 54,794. (No specimens.)

*To all whom it may concern:*

Be it known that I, GEORGE HENRY RICHARDS, merchant, a subject of the King of Great Britain, residing at 128 Southwark street, London, England, have invented a compound for use in horticulture or agriculture for eradicating insect life or mildew and the process of manufacture of the said compound, (for which I have made application for patent in Great Britain, dated November 9, 1900, No. 20,194,) of which the following is a specification.

In the specification accompanying an application for patent made by myself and filed concurrently with this application I described a compound for use in horticulture or agriculture for eradicating insect life and mildew, the compound consisting of nicotin and salicylic acid, forming a salt, which was capable of being entirely volatilized by heat. Now although I have found this compound, as described in the aforesaid specification, to very effectively answer the purposes therein stated and to be eminently advantageous for use in many places and on many occasions, yet in some cases I have found that a want would be supplied by the production of a compound of like nature—that is, a compound containing nicotin and capable of being sold and used in solid form—if such a compound could be easily manufactured and at the same time more cheaply produced than the compound comprising nicotin and salicylic acid, as before stated, even though such a cheaper compound were to leave a small amount of residual matter after volatilization by heat. With this object in view of supplying a compound easily and more cheaply manufactured and one (with the exception of its leaving a residue after volatilization) which will as efficiently answer the purpose for which it is produced I employ a compound consisting of nicotin and tartaric acid, producing a crystalline tetra-tartrate of nicotin, this being a solid salt, which I reduce to powder and mix with a proportion of gum-camphor, the compound then being pressed into cakes or tablets. This compound I have found to effect its object in a sufficiently satisfactory manner, and it has advantages in some respects beyond the salicylate of nicotin, which I have described in my specification of even date with this, in that it is undoubtedly cheaper to manufacture. The addition of a proportion of camphor (gum-camphor) to the tetra-tartrate of nicotin is an important addition, because it aids or forms a medium in the carrying of the vapor produced by the heating of the compound, and it renders the vaporized tetra-tartrate of nicotin very much more effective than it would be without this addition. Moreover, the addition of the gum-camphor not only aids in the effective action of the fumigating compound, but it also serves to bind the dry solid salt and to render the cakes or tablets more convenient for commercial purposes.

The practical manufacture of the compound is carried out by the following process, the proportions of the nicotin given being approximate: To fifty pounds of nicotin I add ninety-three pounds of tartaric acid, the latter being dissolved by means of heat. The mixture is then set aside to cool, and the crystals formed are drained off from the mother-liquor, the said crystals being then dried and reduced to powder. I then add to this dry solid powdered salt (tetra-tartrate of nicotin) a proportion of finely-powdered gum-camphor in the following proportions: To two parts, by weight, of the powdered salt (tetra-tartrate of nicotin) I add one part, by weight, of the powdered gum-camphor. The mixture is then put into molds of convenient size and subjected to pressure, and thus solid cakes or tablets are produced which hold together and are sufficiently strong to well withstand transport and handling, the camphor serving, as aforesaid, not only as a binding agent, but as a vehicle for the transmission of the vapor when the compound is used. When this improved compound is placed into a receiver and heat applied, the mass melts and volatilizes, leaving but a small proportion of residue in the dish. The economy effected by the employment of the constituents stated presents advantages which in many cases adapts the compound for use where the cost of the compound described in the first part of this specification might interfere with its sale and use.

I am aware that tartrate of nicotin has been mentioned in writings upon chemistry, and I therefore do not claim tetra-tartrate of nicotin *per se* as my invention; neither do I broadly claim compounds of nicotin and camphor; but What I do claim as my invention, and desire to secure by Letters Patent, is—

1. The process for preparing an improved solid compound for use in horticulture or agriculture, for eradicating insect life and mildew, consisting in adding a proportion of about ninety-three pounds of tartaric acid to about fifty pounds of nicotin, dissolving the acid in the nicotin by the application of heat, then allowing the liquid to crystallize, draining off the mother-liquor, drying and powdering the crystals and mixing the latter with about half its weight of gum-camphor, and finally compressing the product into cakes or tablets, substantially as set forth.

2. An improved compound for use in horticulture or agriculture, for eradicating insect life or mildew, consisting of nicotin and tartaric acid forming a salt, together with camphor (gum-camphor,) the compound being compressed into the form of solid cakes or tablets and capable of volatilization by heat with but little residue, substantially as set forth.

GEORGE HENRY RICHARDS.

Witnesses:
GRIFFITH BREWER,
W. W. MARSHALL.